United States Patent
Altuev et al.

(10) Patent No.: US 10,839,533 B2
(45) Date of Patent: Nov. 17, 2020

(54) SYSTEMS AND METHODS OF TRACKING OF THE MOVING OBJECTS ON THE VIDEO IMAGE

(71) Applicant: OOO ITV Group, Moscow (RU)

(72) Inventors: Murat K. Altuev, Chernogolovka (RU); Igor I. Falomkin, Moscow (RU); Roman V. Kalinin, Moscow (RU); Vadim V. Shmelyov, Moscow (RU); Egor P. Suchkov, Tuapse (RU)

(73) Assignee: OOO ITV Group, Moscow (RU)

( * ) Notice: Subject to any disclaimer, the term of this patent is extended or adjusted under 35 U.S.C. 154(b) by 0 days.

(21) Appl. No.: 16/044,332

(22) Filed: Jul. 24, 2018

(65) Prior Publication Data
US 2019/0156495 A1    May 23, 2019

(30) Foreign Application Priority Data
Nov. 24, 2017 (RU) ................. 2017141015

(51) Int. Cl.
*G06T 7/20* (2017.01)
*G06T 7/292* (2017.01)
(Continued)

(52) U.S. Cl.
CPC .......... *G06T 7/292* (2017.01); *G06K 9/00342* (2013.01); *G06K 9/00771* (2013.01);
(Continued)

(58) Field of Classification Search
CPC ........... G06T 7/292; G06T 2207/30241; G06T 2207/30232; G06T 7/20; G06K 9/00778;
(Continued)

(56) References Cited

U.S. PATENT DOCUMENTS 9,390,332 B2   7/2016 Takahashi
2010/0157064 A1   6/2010 Cheng et al.
(Continued)

FOREIGN PATENT DOCUMENTS

EP   3239943 A1   11/2017
GB   2550509 A    11/2017
(Continued)

OTHER PUBLICATIONS

Khamukhin, Highly efficient algorithms for semantic processing of video images and control of instrumentation complexes of technical vision, Doctoral Dissertation, Moscow, 2016, Figs 1.1, 2.1, and 2.7, pp. 90-96 and 254.

(Continued)

*Primary Examiner* — Neil R McLean
(74) *Attorney, Agent, or Firm* — IRL Legal Services, LLC; Ilya R. Lapshin

(57) ABSTRACT

A system and method of processing video information received from surveillance cameras for tracking moving objects in real time or archival video. The system can contain a set of image capture devices, a storage device, an image-display device, a data input device, and a set of data processing devices configured for performance of stages. The stages can include a linking of a set of image capture devices to a location map, displaying of the video image from the first image capture device, selecting a moving object which can be tracked by operator as an object of interest, identifying the movement of the selected moving object and its highlight on the video image as area of interest, assessing a direction of the movement of the selected moving object, and predicting a location of the object in the field of view of the second capture device.

12 Claims, 4 Drawing Sheets

(51) Int. Cl.
  *G06K 9/00* (2006.01)
  *H04W 4/33* (2018.01)
  *G06K 9/32* (2006.01)
(52) U.S. Cl.
  CPC ....... *G06K 9/00778* (2013.01); *G06K 9/3241* (2013.01); *H04W 4/33* (2018.02); *G06T 2207/30241* (2013.01)
(58) Field of Classification Search
  CPC ........... G06K 9/00342; G06K 9/00771; G06K 9/3241; H04W 4/33; H04W 4/029; G06F 16/7867; H04N 5/23206; H04N 7/181; G08B 13/19608
  See application file for complete search history.

(56) References Cited

U.S. PATENT DOCUMENTS

| | | |
|---|---|---|
| 2014/0050455 A1 | 2/2014 | Lan |
| 2015/0015718 A1* | 1/2015 | Fujimatsu .......... G06K 9/00771 348/159 |
| 2016/0275358 A1* | 9/2016 | Gutierrez ............ G06F 16/9537 |
| 2016/0335505 A1* | 11/2016 | Renkis ................... H04N 7/181 |
| 2017/0094165 A1* | 3/2017 | Meadow ................. G06T 17/05 |
| 2017/0372575 A1* | 12/2017 | Boghossian ....... G06K 9/00771 |

FOREIGN PATENT DOCUMENTS

| | | |
|---|---|---|
| RU | 2452033 C2 | 5/2012 |
| RU | 2551128 C1 | 5/2015 |
| RU | 2565243 C1 | 10/2015 |

OTHER PUBLICATIONS

Kudelkin et al., Complete Description of the State Security Areas with Geoinformation System; ИЗВесТхЯ СаМарсКоrо Нау Ч Ного Ц еНТра Росс и й СКОй аКД ем и и НауК, Т.17, No. 6(2), 2015.

* cited by examiner

SYSTEMS AND METHODS OF TRACKING OF THE MOVING OBJECTS ON THE VIDEO IMAGE

RELATED APPLICATIONS

This application claims priority to Russian Patent Application No. RU 2017141015, filed Nov. 24, 2017, which is incorporated herein by reference in its entirety.

FIELD OF THE INVENTION

The present invention belongs to area of video surveillance and, more specifically, to systems and methods of processing of the video information received from surveillance cameras for tracking of the moving objects in real time or when viewing archival video.

BACKGROUND

Systems of video surveillance are understood as the hardware-software providing or technical means using including methods of computer vision for the automated data collection, on the basis of the analysis of stream video (video analysis). Systems of video surveillance can lean on the algorithms of processing of the image and recognition of images allows analyzing video without direct participation of the person.

Systems of video surveillance are used as a part of intellectual systems of video surveillance and video search.

Systems of video surveillance, depending on specific goals, can realize a set of functions, for example such as: detection of objects, tracking the movement of objects, classification of objects, identification of objects, detection or recognition of various situations, including disturbing events and etc.

Tracking the movements of objects by using a set of cameras which are located in a control zone and also a prediction of the camera in the field of which view there can be a selected moving object after leaves area of view of the current camera with which video image is at the moment checked by the operator belongs to tasks which are possible for solving by systems of video surveillance.

The solution known from the U.S. Pat. No. 9,390,332 B2, published in Jul. 12, 2016, in which systems and methods of information (images) processing directed to tracking of the person on a set of cameras are opened and capable to foretell in the field of what view of the following camera there will be a tracked person. The system of information processing is configured for identification of the direction of movement of the object which appeared in the video image of the first video camera from a set of video cameras, definition of set of probabilities and a prediction on the basis of the received set of probabilities of one or several following video cameras for which the probability of emergence of the tracked object is higher, than for other video cameras. A lack of this solution is the impossibility of the select of a concrete object and recognition of its movement, and also lack of highlight of a moving object as areas of interest at recognition of the movement. Besides, the solution is not including a stage of a linking a set of video cameras to location map of an object of video surveillance. The specified shortcomings do not allow reaching the necessary level of accuracy of tracking of a concrete moving object in preset territory.

The closest solution at the technical level known from the RU 2551128 C1, published on May 20, 2015, which is characterizes device, the system and a method directed to assistance to the controlling person in performance of a problem of tracking of a moving object. The device is configured to display in real time on the device of display of a set of types of display of the taken images made the corresponding cameras, and a set of types of display are located on the image of the map representing a controlled zone, and the device contains the block of installation of the purpose, for the choice and installation of a moving object as the purpose which has to be tracked, the block of the indication of the purpose which on the basis of information of tracking obtained as a result of processing of images specifies a moving object on each of types on which there is a moving object, the prediction block, for a prediction of the following type of display on which a moving object will appear next time, and the block of the indication of a type of display which specifies the following type of display. This solution is characterized the insufficient accuracy of tracking of the moving objects due to lack of an appropriate linking a set of video cameras to location map of an object of video surveillance. Besides, this solution is not applicable for tracking of the moving objects when viewing archival video. Lack of the fact of recognition of the movement and assessment of the direction of the movement of the selected moving object also belongs to shortcomings.

BRIEF SUMMARY

This technical solution is directed to elimination of the shortcomings inherent in the previous equipment level.

Technical result of the declared group of inventions is increase in accuracy of tracking of the moving objects.

The yielded technical result is achieved by what the system for tracking of the moving objects on the video image in real time contains: set of image capture devices; storage device; image-display device; data input device; a set of data processing device configured for performance of the stages including: a linking a set of image capture devices to location map, to create links between objects on location map and the same objects on the video image; display the video image from the first image capture device; select a moving object which is tracked by operator as an object of interest; recognition of the movement of the selected moving object and considering it on the video image as area of interest; assessment of the direction of the movement of the selected moving object; prediction of the second image capture device in the field of which view there can be a selected moving object after leaves area of view of the first image capture device if it continues to move in the same direction, as at the time of an exit from area of view of the first image capture device; display on the image-display device the video image from the second image capture device, right after that as the selected moving object will leave area of view of the first image capture device.

The specified technical result is also achieved by the system for tracking of the moving objects on the video image when viewing archival video contains: set of image capture devices; storage device; image-display device; data input device; a set of data processing device configured for performance of the stages including: a linking a set of image capture devices to location map by creating links between objects on location map and the same objects on the video image; display of the archival video image from the first image capture device; select a moving object which is tracked by operator as an object of interest; recognition of the movement of the selected moving object and considering it on the video image as area of interest; assessment of the direction of the movement of the selected moving object;

prediction of the second image capture device in the field of which view there can be a selected moving object after leaves area of view of the first image capture device; display on the image-display device of the archival video image from the first image capture device, right after that as a moving object was selected by the operator as an object of interest, and display of the archival video image from the second image capture device begins with that time point in which the selected moving object left area of view of the first image capture device.

The yielded technical result is also achieved due to performance of a method of tracking of the moving objects on the video image, and the method is carried out in real time or when viewing archival video and contains stages at which: linking a set of image capture devices to location map by creating links between objects on location map and the same objects on the video image, and links are set by virtual line segments which one end corresponds to an object arrangement on the video image and other end corresponds to an object arrangement on location map; display the video image from the first image capture device; select a moving object which is tracked by operator as an object of interest; identify the movement of the selected moving object and estimate its direction of the movement; predict the second image capture device in the field of which view there can be a selected moving object after leaves area of view of the first image capture device; displaying on the image-display device of the video image from the second image capture device.

Also technical result is achieved also due to the performance of a method of tracking of the moving objects on the video image which is carried out in real time or when viewing archival video and containing stages at which: linking a set of image capture devices to location map by creating links between objects on location map and the same objects on the video image; display the video image from the image capture device; select a moving object which is tracked by operator as an object of interest; identify the movement of the selected moving object by definition positions of a moving object on location map from coordinates of the positions received from the image capture device, and determination of coordinates of positions of a moving object is carried out by receiving metadata from the image capture device; after recognition of the movement highlights a moving object on the video image as the area of interest, and area of interest is displayed on the image-display device as the translucent rectangular area imposed on the video image; estimate the direction of the movement of the selected moving object on history of positions of the selected moving object; displaying on the image-display device of the video image with the highlighted trajectory of the movement of the selected moving object.

In one particular case of the declared solution each of a set of data processing device is in addition configured for display on the image-display device of the highlighted trajectory of the movement of the selected moving object.

In another particular case of the declared solution of link between objects on location map and the same objects on the video image are set by virtual line segments which one end corresponds to an object arrangement on the video image, and other end corresponds to an object arrangement on location map.

In one particular option only one object can be selected when selecting a moving object.

In other particular option recognition of the movement of a moving object includes definition of positions of a moving object on location map from coordinates of the positions received from the image capture device.

In one particular option determination of coordinates of positions of a moving object is carried out by receiving metadata from the image capture device.

In other particular option assessment of the direction of the movement is carried out on the basis of the history of positions of a moving object kept on the storage device.

In one particular option location map is the open map of streets (OpenStreetMap) or the building map or the map of the protected object.

In other particular option the area of interest is translucent rectangular area.

In one particular option the moving object is a person or group of close going people or the vehicle.

DETAILED DESCRIPTION

The declared technical solution in various options of implementation can be executed in the form of the systems or methods realized by various computer means.

Figure 1:
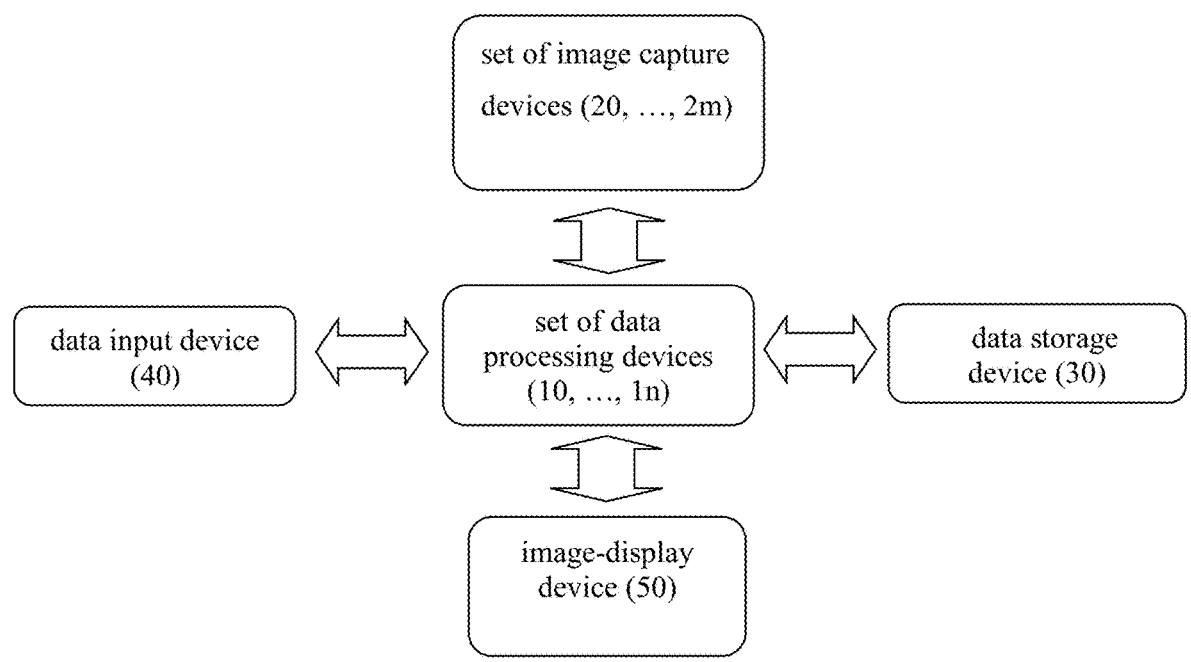
FIG. 1—flowchart of system for tracking of the moving objects.

FIG. 1 shows a flowchart of system for tracking of the moving objects. The system includes: set of data processing device (10, . . . , 1n), set of image capture devices (20, . . . , 2m), data storage device (30), data input device (40) and image-display devices (50).

The image capture device usually is the video camera.

The processor, the microprocessor, the computer (electronic computer), PLC (programmable logical controller) or integrated circuit configured for execution of certain commands (instructions, programs) for data processing (images) can act as the data processing device.

Hard drives (HDD), flash memory, ROM (read-only memory), solid-state stores (SSD) and etc. can act as the data storage device.

The display, the monitor, the video terminal and others can act as the image-display devices.

The data input device can be represented by the mouse manipulator, the keyboard, the touchpad, the stylus, the joystick, the trackpad and etc.

Figure 2:
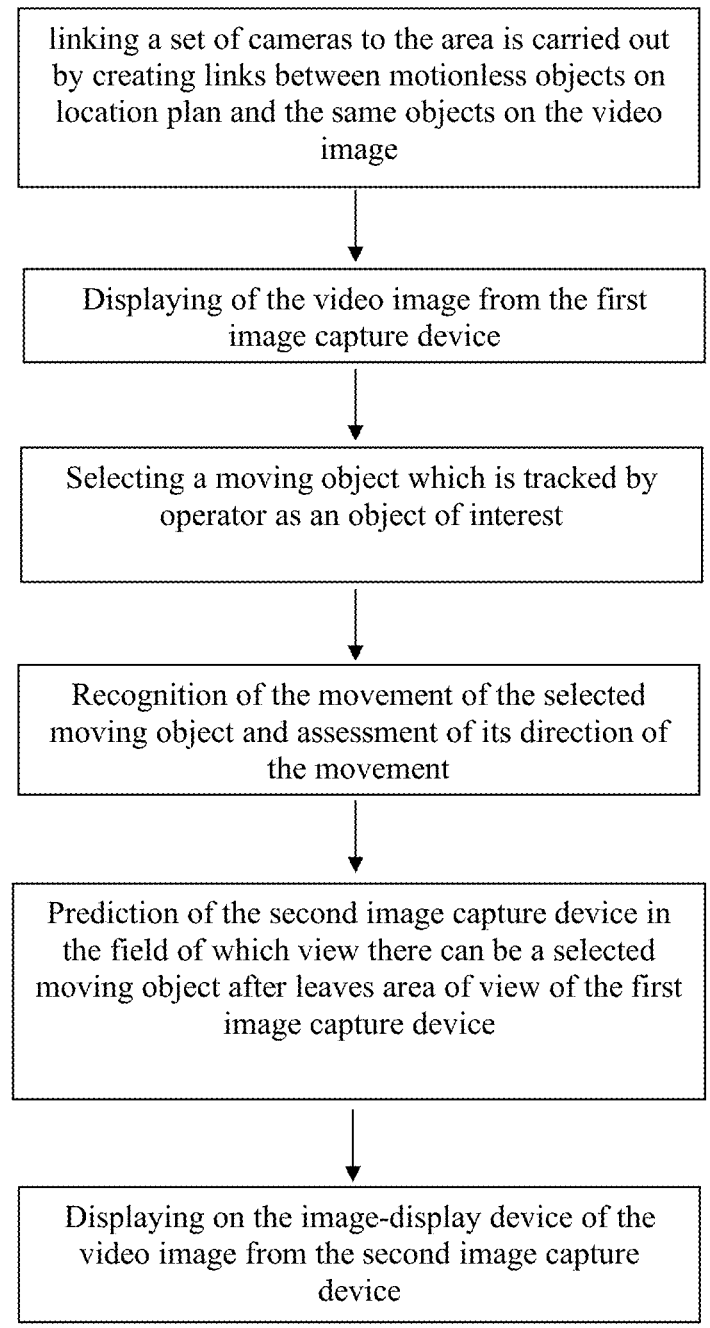
FIG. 2—flowchart of one of options of realization of a method of tracking of the moving objects.

FIG. 2 shows the flowchart of one of options of performance of method of tracking of the moving objects. The specified method can be realized by computer system in two modes: in real time and in browse mode of archival video.

Further stages of performance of a method of tracking of the moving objects, and also basic distinctions of work of systems for tracking the objects in the different modes will be briefly considered.

1. Linking a set of image capture devices to location map.

Location map is a kind of the topographic map or the drawing of the small site of the area in the set scale. In the context of this invention the building map or the protected object, and also the open map of streets (OpenStreetMap)

can be location map. Location map is the image in a public format (.jpeg or .png) and can be two-dimensional or three-dimensional. The map can be loaded into system of video surveillance. The possibility of automatic and/or manual scaling and shift is characteristic of location map.

The linking a set of cameras to the area is carried out by creating links between motionless objects on location map and the same objects on the video image. Various pieces of furniture, office and/or household appliances, doors, window sills and other objects having volume and spatial structure can act as motionless objects. The specified links are set by virtual line segments, one end (point) of which corresponds to an arrangement of a motionless object on the video image, and other end (point) corresponds to an arrangement of a motionless object on location map. The operator sets final points then the system sets virtual line segments. The operator can correct and/or delete the set links.

Figure 3:
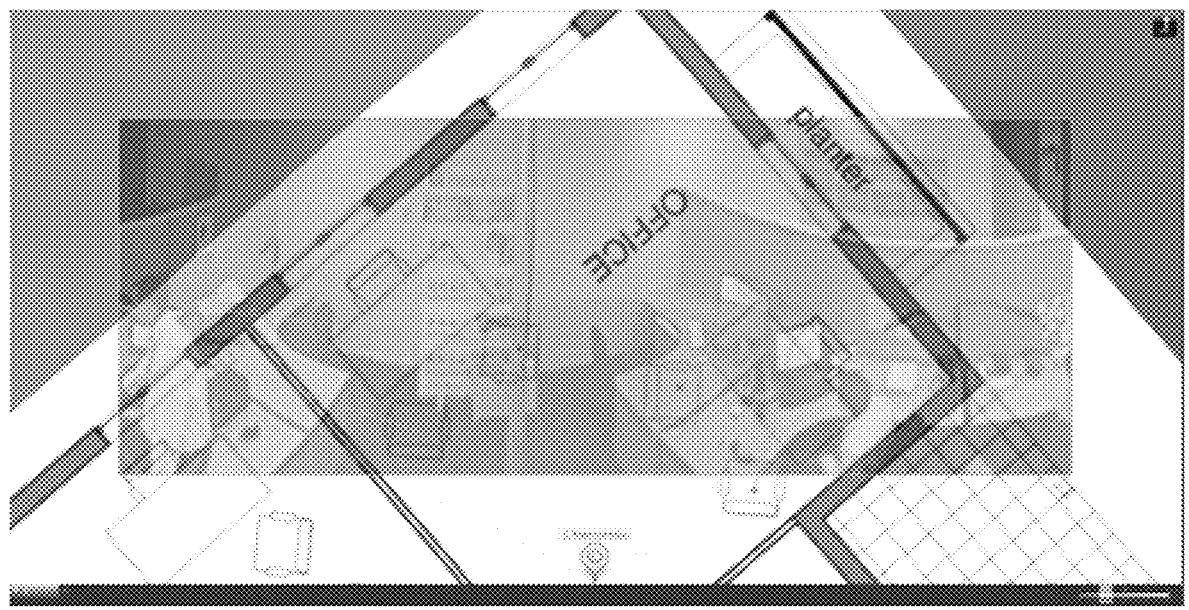
FIG. 3—an example of a linking a set of image capture devices to location map by creating links.

FIG. 3 shows an example of a linking a set of image capture devices to location map by creating four links.

The realization of correlation of the video image with objects on location map can be enabled in the immersion mode. In this mode the operator can "move" between cameras, choosing any camera from the current area of visibility.

In the immersion mode the video image from the selected video camera is displayed over the image of location map. At the same time on the basis of in advance set linking such foreshortening at which subjects to observation on the video image and on location map will coincide is selected. The operator sees location map and the video image imposed on it on the image-display device.

2. Displaying of the video image from the first image capture device.

Video cameras can be installed in more than one room. At the same time to each camera from a set of cameras there can correspond the location map (that is in any area only one video camera can be installed), or several video cameras are installed in one area and the map of this area with an opportunity to switch between video cameras is used. Video images can be displayed imposed over location map on the display screen.

3. Selecting a moving object which is tracked by operator as an object of interest.

At this stage by using of the data input device the operator selects the moving object which is interesting for him. It is only possible to select one interesting moving object, and the person, an animal, the vehicle or group of close going people can be a moving object.

4. Recognition of the movement of the selected moving object and assessment of its direction of the movement.

Proceeding from placement of video cameras on location map calculation of positions of moving objects from coordinates on the current camera in coordinates on location map is made. In one of particular cases recognition of the movement of a moving object includes definition of positions of a moving object on location map from coordinates of the positions received from the image capture device, and determination of coordinates of positions of a moving object is carried out by receiving metadata from the image capture device. The system receives metadata if the tracker (for example, AxxonSoft) or an external tracker works at the camera in the field of which view a moving object is located. It is necessary for the operator for activation of the specified function by the data input device in a video surveillance window to click on a track of the object of interest, at the same time in a window of video surveillance tracking of objects has to be activated (location definition of the moving object in time by camera where the algorithm analyzes video images and issues the position of moving target objects concerning images).

Tracking of objects identifies existence of a moving object in the field of view of the camera and dynamically highlights it on the video image with translucent rectangular area as area of interest. Difference of the proposed technical solution from the solutions, known from area of the equipment, is that highlighting of a moving object is carried out not at a stage of the choice of an object of interest, but only after the system defines that an object of interest moves. Such solution allows the operator to see more precisely a controlled object; at the same time system is more effective to turn the operator's attention to the movements of objects.

Location of moving objects in view of the video camera can be defined by video of the analytics which is built in each video camera. The specified location of objects is determined by the sensors fixing various parts of a range (visible, thermal) or sensors, difference by the principle of action from the video camera, such as radars.

Further, on the basis of the history of positions of a moving object kept on the storage device assessment of the direction of the movement of an object is carried out. History of positions is characteristics of several previous received positions of movements of objects, the speed of the movement, an orientation of the movement on the basis of which one or more data processing device can predict the further direction of the movement of an object of interest.

5. A prediction of the second (following) image capture device in the field of which view there can be a selected moving object after leaves area of view of the first (current) image capture device.

The specified prediction of the camera is carried out in the referral of the movement got at the previous stage. The system counts a further trajectory of the movement of the selected object and defines the camera to which area of view it most likely will get.

6. Displaying on the image-display device of the video image from the second image capture device.

This stage has essential differences when using various browse modes of the video image.

When viewing the video image in real time display on the image-display device of the video image from the second image capture device is carried out right after the selected moving object leaves area of view of the first image capture device.

When viewing the archival video image display on the image-display device of the archival video image from the second image capture device is carried out right after a moving object was selected by the operator as an object of interest. And display of the archival video image from the second image capture device begins with that time point in which the selected moving object left area of view of the first image capture device. Such approach reduces time of viewing of archival video and increases monitoring speed with the purpose to monitor movement of the selected object of interest as allows the operator not to watch in the specified browse mode of archival video all archive from the first camera (not to wait when a moving object leaves area of view of the first camera), and at once to pass to viewing of archive from the second camera (the third, etc.), and from that time point when an object of interest has to appear in the field of its view.

Figure 4:
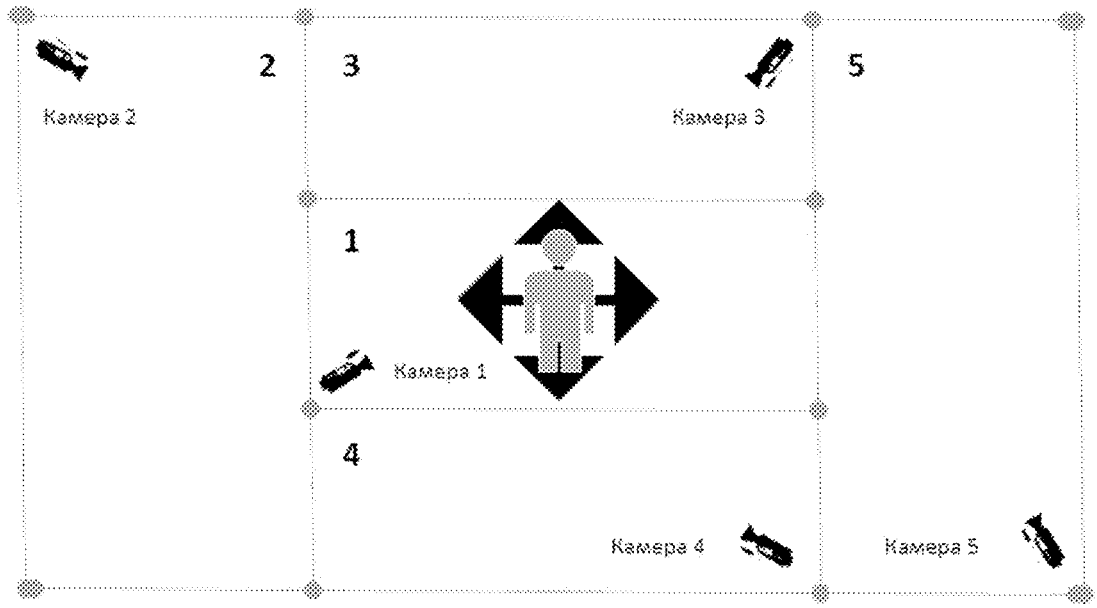
FIG. 4—an example of work of system of tracking of the moving objects.

FIG. 4 shows a concrete example of work of the system of tracking of the moving objects.

Let's consider the room consisting of 5 rooms (zones). In each zone video cameras which survey only the zone, depending on area of view of the video camera are installed. Subject to observation is in a zone 1 in area of view of the Camera 1. If an object moves to the left and will be gone from a camera view 1 (will enter a door), then on the monitor of the operator the Camera 2 will be displayed. If an object moves to the right and will be gone from a camera view 1 (will enter a door), then on the monitor of the operator the Camera 5 will be displayed. If an object moves up and will be gone from a camera view 1 (will enter a door), then on the monitor of the operator the Camera 3 will be displayed. If an object moves down and will be gone from a camera view 1 (will enter a door), then on the monitor of the operator the Camera 4 will be displayed.

Figure 5:
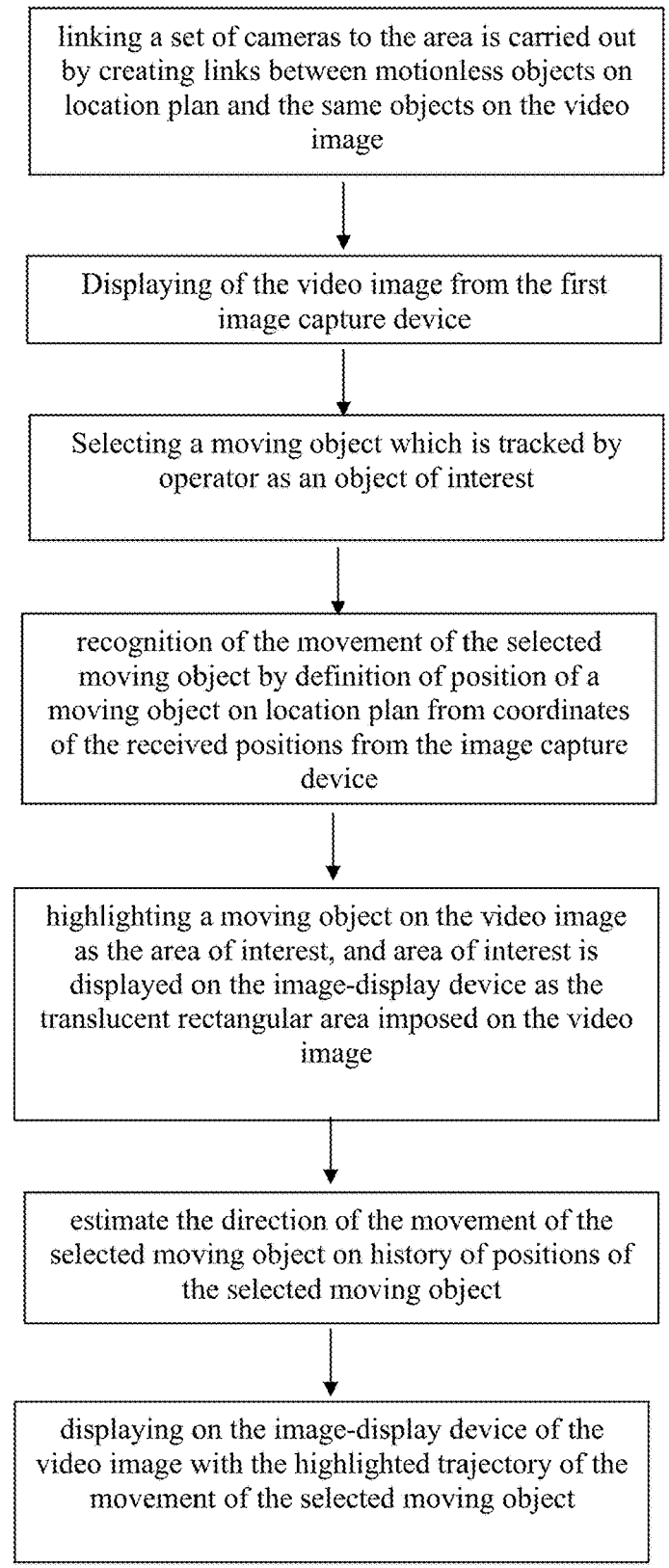
FIG. 5—flowchart of other option of realization of a method for tracking of the moving objects

FIG. 5 shows the flowchart of other option of realization of a method of tracking of the moving objects.

The specified method is carried out by computer means as in real time, and when viewing archival video. Initial stages of this method are similar to the stages which are in detail described above.

Main distinctive and essential features are that after a stage of recognition of the movement automatic highlighting of a moving object on the video image as area of interest is carried out and the area of interest is displayed on the image-display device as the translucent rectangular area imposed on the video image. Further the direction of the movement of the selected moving object is estimated on stories of positions of the selected moving object and displaying on the image-display device of the video image with the highlighted trajectory of the movement of the selected moving object.

Detecting of a start of motion is made on a gradient of an interpersonal difference of the video image in time. At the same time the trajectory of the movement for different objects of interest can be highlighted in different colors. The trajectory of the movement is imposed on the video image also, as well as the translucent rectangular area characterizing area of interest. Highlight system of the movement trajectory provides an opportunity to the operator visually to track the direction of the movement of the selected object and if desired by the data input device, to pass independently to viewing of that camera to which area of view the highlighted object of interest goes. It is easily realized solution on condition of correlation of a set of cameras with location map.

If necessary, at least, a part of various operations considered in the description of this invention can be executed in different ways from presented an order and/or at the same time with each other.

Though this invention was described in detail for an illustration of the most practical way and preferable options of implementation, it is necessary to understand that this invention is not limited to the opened options of implementation and moreover, is intended for modification and various other combinations of characteristics from the described implementation options. For example, it is necessary to understand that the present invention assumes that in possible degree, one or more characteristics of any option of implementation can be combined with other one or more characteristics of any other option of implementation.

The invention claimed is:

1. A system for tracking moving objects on live video images comprising:
a plurality of non-moving image capture devices;
a storage device;
an image display;
a data input device; and
a plurality of data processing devices configured
to link the plurality of image capture devices to a location map by creating links between non-moving objects on the location map and corresponding non-moving objects in the video image;
to display a video image from a first image capture device;
to select a moving object tracked by an operator as an object of interest;
to determine a trajectory of the selected moving object;
to highlight the trajectory on the video image as an area of interest;
to determine a direction of the trajectory of the selected moving object;
after the moving object leaves a field of view of the first image capture device, to determine a second image capture device having the moving object in a field of view of the second image capture device using the direction of the trajectory of the selected moving object when the moving object leaves the field of view of the first image capture device; and
to display on the image display the video image from the second image capture device when the selected moving object leaves the field of view of the first image capture device;
wherein the links between the non-moving objects on the location map and the objects in the video image are set as virtual line segments, wherein one end of each virtual line segment corresponds to the location of the non-moving object in the video image, and the other end of each virtual line segment corresponds to the location of the non-moving object on the location map.

2. The system of claim 1, wherein each of the plurality of data processing devices is configured to display a highlighted trajectory the selected moving object on the image display.

3. The system of claim 1, wherein only one moving object can be selected.

4. The system of claim 1, wherein the determining of the trajectory of the moving object comprises determining coordinates of the moving object on the location map using coordinates of the moving object obtained from the image capture device.

5. The system of claim 1, wherein the determining of the trajectory of the moving object comprises determining coordinates of the moving object on the location map using metadata of the moving object obtained from the image capture device.

6. The system of claim 1, wherein the determining of the direction of the trajectory comprises using an object coordinate history stored on the storage device.

7. The system of claim 1, wherein the location map is an open street map, or a building map, or a map of the protected object.

8. The system of claim 1, wherein the moving object is a person, or a group of people, or a vehicle.

9. A system for tracking objects on live video images comprising:
a plurality of image capture devices;
a storage device;
an image display;
a data input device; and
a plurality of data processing devices configured
to link the plurality of image capture devices to a location map by creating links between the objects on a location map and corresponding objects in the video image;

to display a video image from a first image capture device;
to select a moving object tracked by an operator as an object of interest
to determine a trajectory of the selected moving object
to highlight the trajectory on the video image as an area of interest
to determine a direction of the trajectory of the selected moving object;
after the moving object leaves a field of view of the first image capture device, to determine a second image capture device having the moving object in a field of view of the second image capture device using the direction of the trajectory of the selected moving object when the moving object leaves the field of view of the first image capture device; and
to display on the image display the video image from the second image capture device when the selected moving object leaves the field of view of the first image capture device,
wherein the highlighted area of interest is displayed on the image display as a translucent rectangular area superimposed on the video image.

10. A system for tracking moving objects on stored video images comprising:
a plurality of non-moving image capture devices;
a storage device;
an image display;
a data input device; and
a plurality of data processing devices configured
to link the plurality of image capture devices to a location map by creating links between non-moving objects on a location map and corresponding non-moving objects in the video image;
to display a stored video image from a first image capture device;
to select a moving object tracked by an operator as an object of interest;
to determine a trajectory of the selected moving object;
to highlight the trajectory on the video image as an area of interest;
to determine a direction of the trajectory of the selected moving object;
to determine a second image capture device having the moving object in a field of view of the second image capture device after the moving object leaves a field of view of the first image capture device; and
to display on the image display a stored video image from the second image capture device after the selection by the operator, wherein the displaying the stored video image from the second image capture device begins when the selected moving object leaves the field of view of the first image capture device;
wherein the links between the non-moving objects on the location map and the objects in the video image are set as virtual line segments, wherein one end of each virtual line segment corresponds to the location of the non-moving object in the video image, and the other end of each virtual line segment corresponds to the location of the non-moving object on the location map.

11. A method for tracking moving objects on live or stored video image, comprising:
linking a plurality of non-moving image capture devices to a location map by creating links between non-moving objects on a location map and corresponding non-moving objects in the video image, wherein the links are set as virtual line segments, wherein one end of each virtual line segment corresponds to the location of the non-moving object in the video image, and the other end of each virtual line segment corresponds to the location of the non-moving object on the location map;
displaying a video image from a first image capture device;
selecting a moving object tracked by an operator as an object of interest
determining a trajectory of the selected moving object;
determining a direction of the trajectory of the selected moving object;
determining a second image capture device having the moving object in a field of view of the second image capture device when the moving object leaves the field of view of the first image capture device; and
displaying on the image display the video image from the second image capture device;
wherein the links between the non-moving objects on the location map and the objects in the video image are set as virtual line segments, wherein one end of each virtual line segment corresponds to the location of the non-moving object in the video image, and the other end of each virtual line segment corresponds to the location of the non-moving object on the location map.

12. A method for tracking objects on live or stored video image, comprising:
link a plurality of image capture devices to a location map by creating links between the objects on a location map and corresponding objects in the video image;
displaying a video image from an image capture device;
selecting a moving object tracked by an operator as an object of interest;
determining a trajectory of the moving object comprising determining coordinates of the object on the location map using coordinates of the object obtained from the image capture device,
wherein the determining the trajectory of the object comprises determining coordinates of the object on the location map using metadata of the object obtained from the image capture device;
determining a trajectory of the selected moving object;
highlighting the trajectory on the video image as an area of interest,
wherein the highlighted area of interest is displayed on the image display as a translucent rectangular area superimposed on the video image;
determining a direction of the trajectory of the selected moving object using an object coordinate history;
displaying on the image display the video image with the highlighted trajectory of the selected moving object.

* * * * *